United States Patent [19]

Zecchin

[11] Patent Number: 5,662,964
[45] Date of Patent: Sep. 2, 1997

[54] PROCESS FOR COATING THE INTERNAL SURFACE OF HYDROTHERMOSANITARY PIPES, PARTICULARLY MADE OF ALUMINIUM, WITH RESINOUS PRODUCTS AND PIPES OBTAINED THEREWITH

[75] Inventor: Severino Zecchin, Onara di Tombolo, Italy

[73] Assignee: Lenair SRL, Onara di Tombolo, Italy

[21] Appl. No.: 347,361

[22] PCT Filed: Feb. 15, 1994

[86] PCT No.: PCT/EP94/00436

§ 371 Date: Mar. 13, 1995

§ 102(e) Date: Mar. 13, 1995

[87] PCT Pub. No.: WO94/23845

PCT Pub. Date: Oct. 27, 1994

[30] Foreign Application Priority Data

Apr. 22, 1993 [IT] Italy .................... PD93A0091

[51] Int. Cl.⁶ .................................... B05D 7/22
[52] U.S. Cl. ............... 427/232; 427/235; 427/238; 427/239; 427/348; 427/385.5; 427/388.1
[58] Field of Search ................ 427/232, 235, 427/348, 385.5, 239, 388.1, 238, 231

[56] References Cited

U.S. PATENT DOCUMENTS

| 2,707,934 | 5/1955 | Curtis | 118/408 |
| 4,262,627 | 4/1981 | Roeder et al. | 118/318 |
| 4,327,132 | 4/1982 | Shinno | 427/235 |
| 4,454,173 | 6/1984 | Koga | 427/235 |
| 4,454,174 | 6/1984 | Koga | 427/235 |
| 5,326,400 | 7/1994 | Sagawa | 427/235 |
| 5,499,659 | 3/1996 | Naf | 427/235 |

FOREIGN PATENT DOCUMENTS

| 0473103A1 | 3/1992 | European Pat. Off. . |
| 0485653A1 | 5/1995 | European Pat. Off. . |
| 412680 | 4/1925 | Germany . |
| 8700906 | 2/1987 | WIPO . |

Primary Examiner—Janyce Bell
Attorney, Agent, or Firm—Paul & Paul

[57] ABSTRACT

A process is described to realize a film made of an adequate resinous material on the internal surface of metallic pipes, particularly those made of aluminium, to protect them and further allow for particular uses for which they could not be employed otherwise. These pipes are preferably applied in the hydrothermosanitary field.

5 Claims, 3 Drawing Sheets

PROCESS FOR COATING THE INTERNAL SURFACE OF HYDROTHERMOSANITARY PIPES, PARTICULARLY MADE OF ALUMINIUM, WITH RESINOUS PRODUCTS AND PIPES OBTAINED THEREWITH

The present invention deals with a process for coating the internal surface of hydrothermosanitary pipes, particularly made of aluminium, with resinous products, also of the atoxic type or "for foods", and with the related pipes obtained with such process.

In hydrothermosanitary plants, pipes play a role that cannot be neglected. Currently, pipes made of iron (zinc-coated pipes), of copper or resinous materials, etc. are used. Aluminium pipes, even though they cost much less, are not used, because they can be easily corroded from the chemical and electro-chemical (stray currents) points of view.

All metallic pipes can then be coated by limestone, depending on water hardness and temperature. Problems deriving from limestone, chemical corrosions and stray currents are solved for metallic pipes, but above all for aluminium pipes, by adopting the protection of the internal surface thereof, protection that can be achieved by the process claimed by the present invention.

After having carried out the pipe seal test (in coils or in rods), through pressurized air, in order to ascertain the absence of defects (due to pores or cracks), a resinous liquid is injected inside the pipe (generally kept at ambient temperature), said liquid having to wet all the internal surface thereof. In order to enable the whole internal pipe surface to be coated by the resinous liquid flowing inside it, the pipe (generally in coils) is placed and kept slowly oscillating or slowly rotating for all the length of the present operation and of the further operations.

Afterwards, air is blown into the pipe, and the liquid is made turbolent (facilitating wetting of possible areas that had not been coated by it) and the excess liquid is removed.

Then, a gauged head, equipped with adequate gaskets (shaped as a socket, like those used for pistons, or shaped as an O-ring, etc.), is inserted and, urged by compressed air, crosses the whole pipe "shaving" the internal surface (improving adherence of the resinous liquid on the internal pipe surfaces) and adjusting the resinous liquid thickness and finally exhausting the excess (of liquid) that should result from it.

Finally, the pipe (arranged in coils or in rods), still subjected to oscillation or rotation, is inserted into an oven and is subjected to hot air blow-in, to facilitate and speed up scavenging of (solvent) gases, that are removed from the resinous liquid fill that covers the internal pipe surface.

When the protective resinous fill has been strengthened, the operation comes to an end. A pipe is obtained with a smooth and continuos internal surface, having resistance properties to wear, chemical and electro-chemical corrosions and having atoxicity and anti-adherence properties to limestone that pertain to the adopted resinous product. Fixing of the fill to the pipe material is such that no disjunctions whatsoever occur, neither due to thermal stresses, nor due to mechanical stresses. The pipe therefore can, during installation, be shaped, bent, squashed without any problem and, during operation, can be subjected to normal thermal variations to which the plant is subjected.

The process with the related described sequences, that have been adopted for the pipe (generally made of aluminium) wound in coils, is also adopted for the rod-configured pipe by carrying out the adequate modifications required.

If the pipes in rods are horizontally arranged, the end rods are connected with tubular fittings (such as to create a seal to the blown-in air and the passing continuity for the shaving head), so that they are all arranged in series, and then the procedure adopted for pipes in coils is adopted.

That is, the resinous liquid is then injected.

Afterwards, pressurized air is blown-in and the liquid is made turbolent while the eccess one is removed.

The shaving head is inserted and this, urged by compressed air, crosses the whole pipe.

This operation improves liquid adherence to the internal surface, while the resinous liquid thickness is adjusted in adherence and the possible excess is exhausted. Everything is finally taken to an oven while contemporarily blowing-in hot air, to scavenge the solvent gases that go out of the resinous liquid film covering the internal pipe surface. Should the pipe rod arrangement be vertical, instead, the resinous liquid is made go inside the pipes by immersion. Then, the pipes are lifted and let drip. The shaving head is inserted into each pipe and made pass therethrough, and then the pipes are taken into an oven to strengthen their film.

In the previously-described treatments, if a thicker film has to be obtained, the cycle is repeated twice or three times.

Further, if films of a different material from the previous one have to be overlapped when repeating the cycles, different compositions of resinous liquids are adopted.

If in hydrothermosanitary plants, the internally treated alum/aim pipes are used and it is desirable to employ the same fittings used for the usual copper pipes, the aluminium pipes are externally coated with adequate resinous materials.

If then the metallic pipes are externally covered with suitable polypropylene thicknesses, fittings made of thermoplastic material can be adopted, that are already employed in these plants, carried out for propylene pipes (Rando-type fittings).

BRIEF DESCRIPTION OF THE DRAWINGS

What has been previously described will be clarified taking into account the enclosed diagrammatic drawing tables, in which.

DETAILED DESCRIPTION OF THE PREFERRED EMBODIMENTS

Figure 1:
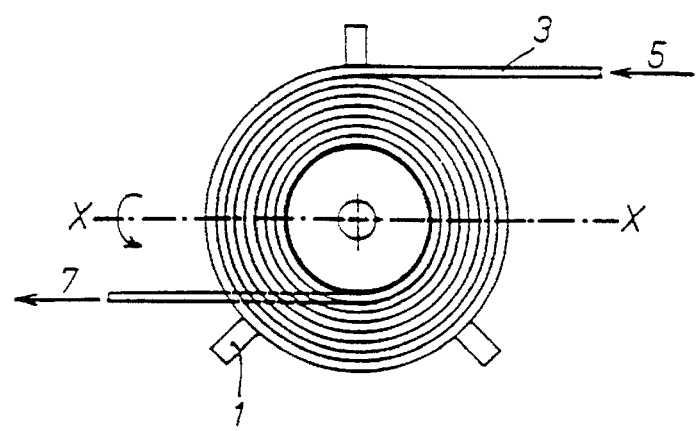
FIG. 1 is a plan view of a reel with a pipe coil.

FIG. 1 is a plan view of a reel 1 with a pipe coil 3. Reference 5 Shows the inlet (beginning) and reference 7 the outlet (end) of the pipe.

The vessel for the resinous liquid to be injected has not been shown, nor the air source, nor the pressurized air devices nor heating source and apparatus. Recovery vessels and handling means, etc. have not been shown as well. The above objects have not been represented because their related means and apparatus are quite available in common production activities and, taken one by one and taken into account individually, cannot be considered as integral part of the inventive process described.

Figure 2:
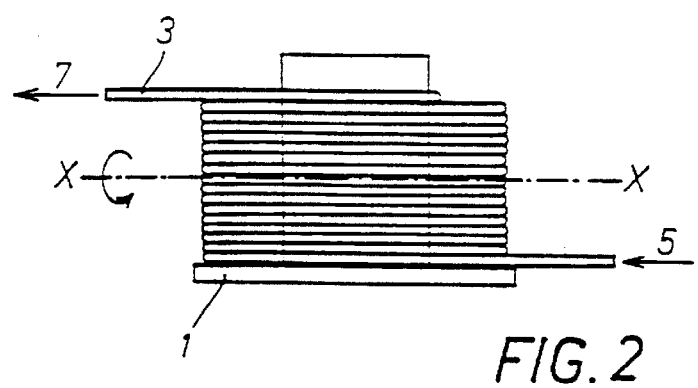
FIG. 2 is a side view of the reel and pipe coil assembly.

FIG. 2 is a side view of the reel 1 and pipe coil 3 assembly. 5 and 7 again show the beginning and end of the pipe 3.

A generic axis, around which the pipe coils are made oscillate or rotate during the operating stages, has been referred to as (x—x).

Figure 3:
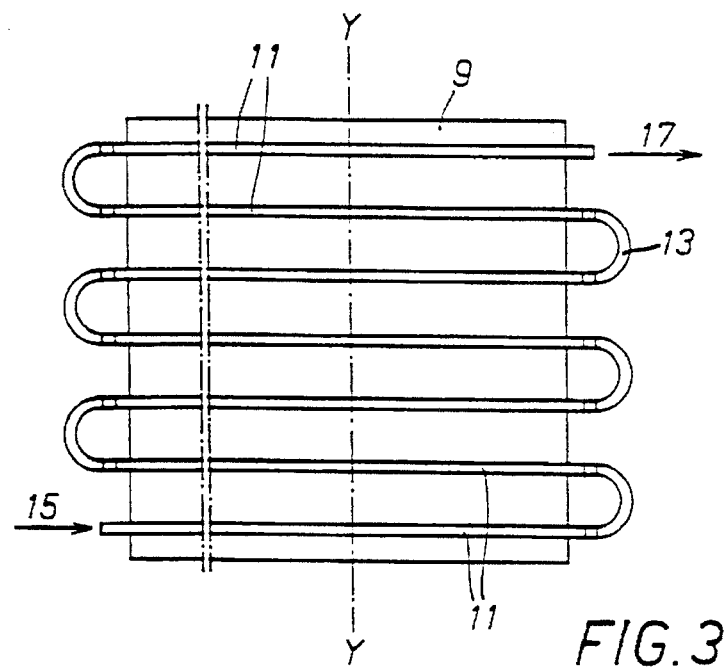
FIG. 3 is a side view of an horizontal plane supporting pipes in rods.

FIG. 3 shows an horizontal plane 9 supporting pipes in rods 11. The tubular fittings connecting pipe ends have been marked with 13, while 15 and 17 mark the beginning and end of the assembly of pipes arranged in series one with the other.

The tubular fittings 13 are connected to the rods 11 in such a way as to create a seal to blown-in air and passing continuity for the shaving head 19, by adopting adequate measures.

In this case, too, the horizontal plane 9 supporting the pipes in rods is made oscillate or rotate around a generic axis (y—y).

Figure 4:
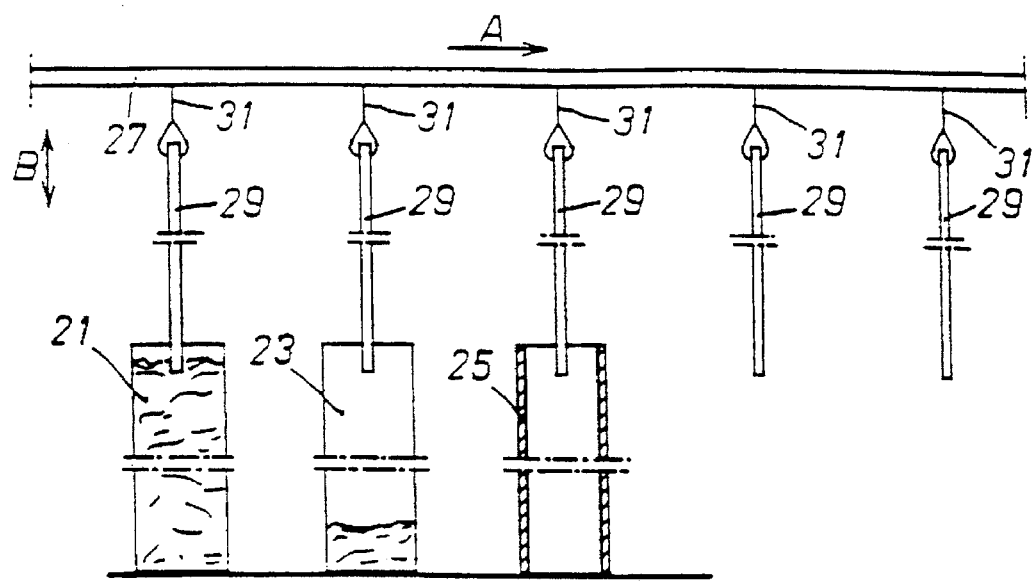
FIG. 4 is a side view of the tanks for immersion wetting and for dripping collection of the excess resinous liquid and for the one coming from shaving with the adequate head.

FIG. 4 shows the tanks 21, 23 for immersion wetting and for dripping collection of the excess resinous liquid and for the one coming from shaving with the adequate head; 25 shows the drying oven; 27 shows the chain to support and handle pipes 29. The chain 27 is equipped with connections 31 to support pipes 29 and is periodically moving according to a translation motion A, coordinated with the lifting and lowering motion B.

Figure 5:
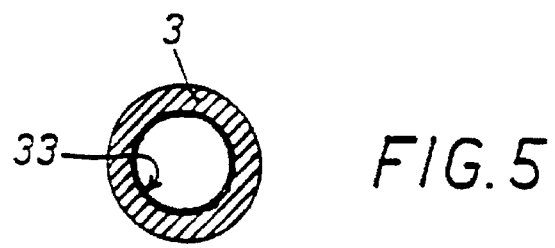
FIG. 5 is a section of a generic pipe internally coated according to the present invention.
Figure 6:
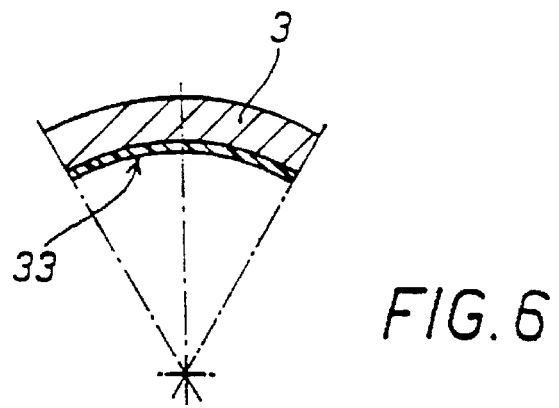
FIG. 6 is an enlarged diagrammatic view of a pipe stretch.

FIG. 5 is a section of a generic pipe internally coated according to the present invention and FIG. 6 is an enlarged diagrammatic view of a pipe stretch.

3 shows the pipe and 33 shows the film thereof made of resinous material, adhering to the internal surface thereof.

Figure 7:
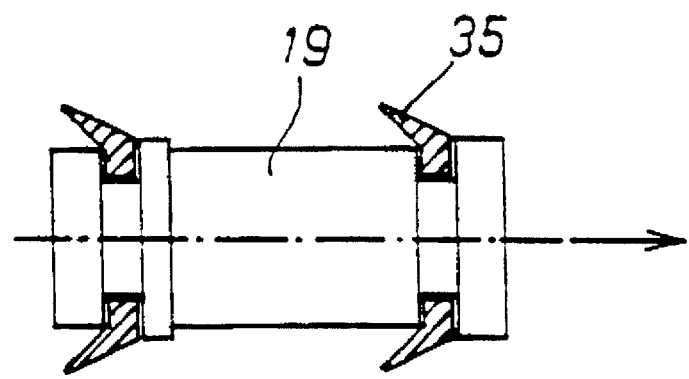
FIG. 7 is a side view of a generic shaving head equipped with two flexible socket gaskets.

FIG. 7 shows a generic shaving head 19 equipped with two flexible socket gaskets 35.

Figure 8:
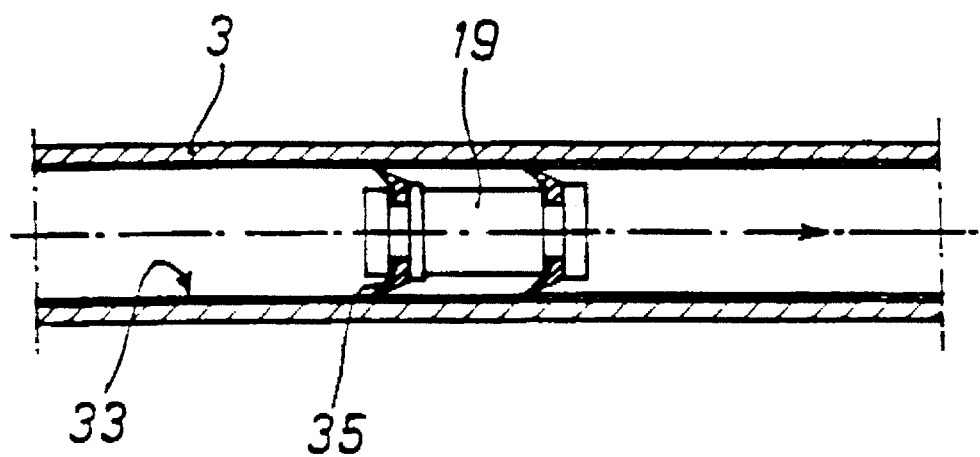
FIG. 8 is a side view of the shaving head advancing inside the pipe.

FIG. 8 shows the shaving head 19 advancing inside the pipe 3, urged by the compressed air, smoothing and gauging, through gaskets 35, the film 33 of the resinous liquid adhering to the internal surface.

After what has been described, the relevant importance of the invention is clarified, since it allows obtaining metallic pipes internally coated with resins, that, especially in the hydrothermosanitary field, are not subjected any more to limestone deposits, and are protected against chemical and electro-chemical corrosions in addition to those due to stray currents.

The process of the present invention particularly allows employing, in the hydrothermosanitary field, aluminium pipes, that, being decidedly subjected to various reaction aggressions, with respect to other metals (copper, iron, etc.), could not be used at all.

This provides a sensible economic advantage, since aluminium has a reduced specific gravity and a rather low purchasing cost.

Adopting other systems, like spraying or wetting through operating heads, applied to probes passing inside the pipes to be treated, in order to obtain the internal protective film, is still within the scope of the present invention.

The following are not limits to the invention: number of films (of the same species or of different species) applied inside the pipe; nature of materials composing the film (or films); thickness or single thicknesses or global thickness of the final film; colour; hardness or other properties.

I claim:

1. Process for coating the internal surface of metallic hydrothermosanitary pipes wound in coils or rod-configured with resinous products, said resinous products also being of the atoxic type which can be used in contact with foods, characterized in that said process comprises the steps of:

injecting resinous liquid inside a pipe;

blowing-in air to make said resinous liquid turbulent and to remove an excess part of said resinous liquid;

generating a film of said resinous liquid on the internal surface of said pipes; and inserting a head, equipped with flexible gaskets shaped as a ring;

advancing said head, with the force of pressurized air;

carrying out a shaving with said advancing head, said shaving including gauging and smoothing the film of said resinous liquid on the internal surface of said pipe;

ejecting through said head said excess part of said resinous liquid;

stabilizing said film of said resinous liquid.

2. Process for coating hydrothermosanitary pipes according to claim 1, characterized in that the step of stabilizing said film includes applying heat to strengthen said film.

3. Process for coating hydrothermosanitary pipes according to any one of claims 1 or 2, further including the step of moving said pipe about an axis thereof during the process, to facilitate the prevention of separations or the prevention of accumulations of resinous liquid due to gravity and to improve wetting of the internal surface of the pipe.

4. Process for coating hydrothermosanitary pipes according to claim 3, characterized in that said stabilizing step is divided into steps of:

taking into an oven said pipe; and simultaneously passing heated air inside said oven, in order to remove solvent vapors, that go out of said resinous liquid film distributed on said internal surface.

5. Process for coating hydrothermosanitary pipes according to claim 2, characterized in that said stabilizing step is divided into the steps of:

taking into an oven said pipe; and simultaneously passing heated air inside said oven, in order to remove solvent vapors, that go out of said resinous liquid film distributed on said internal surface.

* * * * *

UNITED STATES PATENT AND TRADEMARK OFFICE
CERTIFICATE OF CORRECTION

PATENT NO. : 5,662,964
DATED : September 2, 1997
INVENTOR(S) : Severino Zecchin

It is certified that error appears in the above-identified patent and that said Letters Patent is hereby corrected as shown below:

Claim 5, line 5, delete "oven" and replace wtih -- pipe --

Signed and Sealed this

Twenty-fourth Day of November,1998

Attest:

BRUCE LEHMAN

Attesting Officer    Commissioner of Patents and Trademarks